United States Patent
Johnson et al.

(10) Patent No.: US 10,414,026 B2
(45) Date of Patent: Sep. 17, 2019

(54) MULTI-FUNCTIONAL DEBUR TOOL

(71) Applicant: The Boeing Company, Chicago, IL (US)

(72) Inventors: Stanley Gilbert Johnson, Snohomish, WA (US); Frankie T. Fernandez, Jr., Marysville, WA (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 15/447,979

(22) Filed: Mar. 2, 2017

(65) Prior Publication Data
US 2018/0250794 A1    Sep. 6, 2018

(51) Int. Cl.
| B24D 7/14 | (2006.01) |
| B24D 7/18 | (2006.01) |
| B23B 51/10 | (2006.01) |
| B23B 49/00 | (2006.01) |
| B24D 13/16 | (2006.01) |
| B24D 9/00 | (2006.01) |

(52) U.S. Cl.
CPC .............. B24D 13/16 (2013.01); B23B 49/00 (2013.01); B23B 51/10 (2013.01); B23B 51/107 (2013.01); B24D 7/14 (2013.01); B24D 7/18 (2013.01); B24D 9/003 (2013.01)

(58) Field of Classification Search
CPC ....... B23B 51/00; B23B 51/10; B23B 51/107; B23B 49/00; B24D 7/14; B24D 7/18
USPC ..................................................... 451/54, 57
See application file for complete search history.

(56) References Cited

U.S. PATENT DOCUMENTS

| 1,643,679 | A | * | 9/1927 | Roderick | ................ | B23B 51/08 |
| | | | | | | 408/223 |
| 2,694,321 | A | * | 11/1954 | Riza | ........................ | B23B 5/168 |
| | | | | | | 408/154 |
| 2,978,846 | A | * | 4/1961 | Barron | ....................... | B24B 5/01 |
| | | | | | | 408/145 |
| 4,720,218 | A | * | 1/1988 | DeFries | .................. | B23B 51/00 |
| | | | | | | 407/1 |
| 4,854,871 | A | * | 8/1989 | Weissman | ............... | A61C 13/30 |
| | | | | | | 433/166 |
| 4,917,550 | A | * | 4/1990 | Aurentz | ................ | B23B 51/107 |
| | | | | | | 408/225 |
| 5,078,555 | A | * | 1/1992 | Aurentz | ................ | B23B 51/107 |
| | | | | | | 408/231 |
| 5,354,155 | A | * | 10/1994 | Adams | .................... | B23B 51/00 |
| | | | | | | 408/145 |
| 5,487,627 | A | * | 1/1996 | Kasutani | ............... | B23B 51/107 |
| | | | | | | 408/145 |
| 5,601,476 | A | * | 2/1997 | Maier | ..................... | B24B 15/02 |
| | | | | | | 29/888.075 |
| 5,641,027 | A | * | 6/1997 | Foster | ....................... | E21B 4/02 |
| | | | | | | 175/107 |
| 5,863,161 | A | * | 1/1999 | Tayne | .................... | B23B 51/107 |
| | | | | | | 408/224 |

(Continued)

*Primary Examiner* — Eileen P Morgan
(74) *Attorney, Agent, or Firm* — Yee & Associates, P.C.

(57) ABSTRACT

A system and method for a composite finishing system. The composite finishing system comprises an abrasive bit with an abrasive material on a removal surface of the abrasive bit, where in the abrasive bit has a pilot structure that positions an abrasive surface relative to an edge break intersection of a hole in a composite structure when a pilot structure is placed into the hole.

22 Claims, 10 Drawing Sheets

(56) References Cited

U.S. PATENT DOCUMENTS

| | | | | |
|---|---|---|---|---|
| 5,997,222 | A * | 12/1999 | Rissler | B23B 51/104 |
| | | | | 408/201 |
| 6,514,258 | B1 * | 2/2003 | Brown | A61C 1/084 |
| | | | | 408/202 |
| 6,684,514 | B2 * | 2/2004 | Welch | B23B 47/287 |
| | | | | 30/366 |
| 6,866,032 | B2 * | 3/2005 | Magyar | H02G 3/121 |
| | | | | 125/13.01 |
| 7,028,790 | B2 * | 4/2006 | Moore | E01C 23/0946 |
| | | | | 175/334 |
| 7,204,664 | B2 * | 4/2007 | Nakanishi | B24D 7/14 |
| | | | | 408/1 R |
| 8,220,301 | B2 * | 7/2012 | Ghiran | B21J 5/066 |
| | | | | 72/325 |
| 8,454,281 | B2 * | 6/2013 | Katzenberger | B23B 49/00 |
| | | | | 408/100 |
| 8,838,205 | B2 * | 9/2014 | Shoham | A61B 17/1703 |
| | | | | 600/424 |

* cited by examiner

MULTI-FUNCTIONAL DEBUR TOOL

BACKGROUND INFORMATION

1. Field

The present disclosure relates generally to manufacturing and, in particular, to a method and apparatus for reducing inconsistencies in a hole by using a multi-functional debur tool.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections and then be assembled to form the fuselage of the aircraft. Other examples include, without limitation, wing sections joined to form a wing or stabilizer sections joined to form a stabilizer.

Holes are often created in composite structures using tools such as drills. In some cases, the holes are chamfered holes. A chamfered hole is a hole in which the cutter creates a counter sink in the hole. This counter sink is a portion near the surface that is enlarged relative to the other portion the hole. This enlarged portion may be designed to allow the head of a screw, a bolt, or other fastener to lie flush or below the surface of the composite structure when installed.

In performing machining operations to form these holes, sharp fibers often remain at an edge break intersection of a chamfered hole within a composite structure, such as a composite laminated panel. Currently, these fibers are sanded by human operators using abrasive cleaning pads. This type of process is time-consuming and labor-intensive and could potentially introduce ergonomic or safety issues for the operators, such as repetitive motion or carbon fiber slivers embedded in the skin of the operators.

Therefore, it would be desirable to have a method and apparatus that take into account at least some of the issues discussed above, as well as other possible issues. For example, it would be desirable to have a method and apparatus that overcome a technical problem with forming holes in composite structures. It would be desirable to have a method and apparatus that overcomes a technical problem with removing inconsistencies, such as carbon fiber slivers that extend from edge break intersections of the holes formed in composite structures.

SUMMARY

An embodiment of the present disclosure provides for a composite finishing system. The composite finishing system provides for an abrasive bit. The abrasive bit has an abrasive material on a removal surface of the abrasive bit, wherein the abrasive bit has a pilot structure that positions an abrasive surface relative to an edge break intersection of a hole in a composite structure when the pilot structure is placed into the hole.

Another embodiment of the present disclosure provides for a method for removing inconsistencies from a hole in a composite structure. The method comprises moving a pilot structure on an abrasive bit into the hole of the composite structure in a direction along a rotation axis for the abrasive bit. The pilot structure positions an abrasive surface relative to an edge break intersection of the hole when the pilot structure is placed into the hole. The abrasive bit is rotated while the pilot structure is in the hole. The abrasive bit has an abrasive material on a removal surface of the abrasive bit that removes undesired fibers from the edge break intersection of the hole.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. Those embodiments recognize and take into account that the current techniques for removing inconsistencies from holes, such as undesired fibers at the edge break intersections of chamfered holes, are not as efficient as desired. The illustrative embodiments recognize and take account that ergonomics with respect to human operators is not as optimal as desired with current techniques for using abrasive pads. Further, the time and effort needed to remove these inconsistencies are greater than desired.

Thus, the illustrative embodiments provide a method and apparatus for removing undesired fibers from holes. In one illustrative example, a composite finishing system includes an abrasive bit having an abrasive material on a removal surface of the abrasive bit. The abrasive bit has a pilot structure that positions an abrasive surface relative to an edge break intersection of a hole in a composite structure when the pilot structure is placed into the hole.

Figure 1:
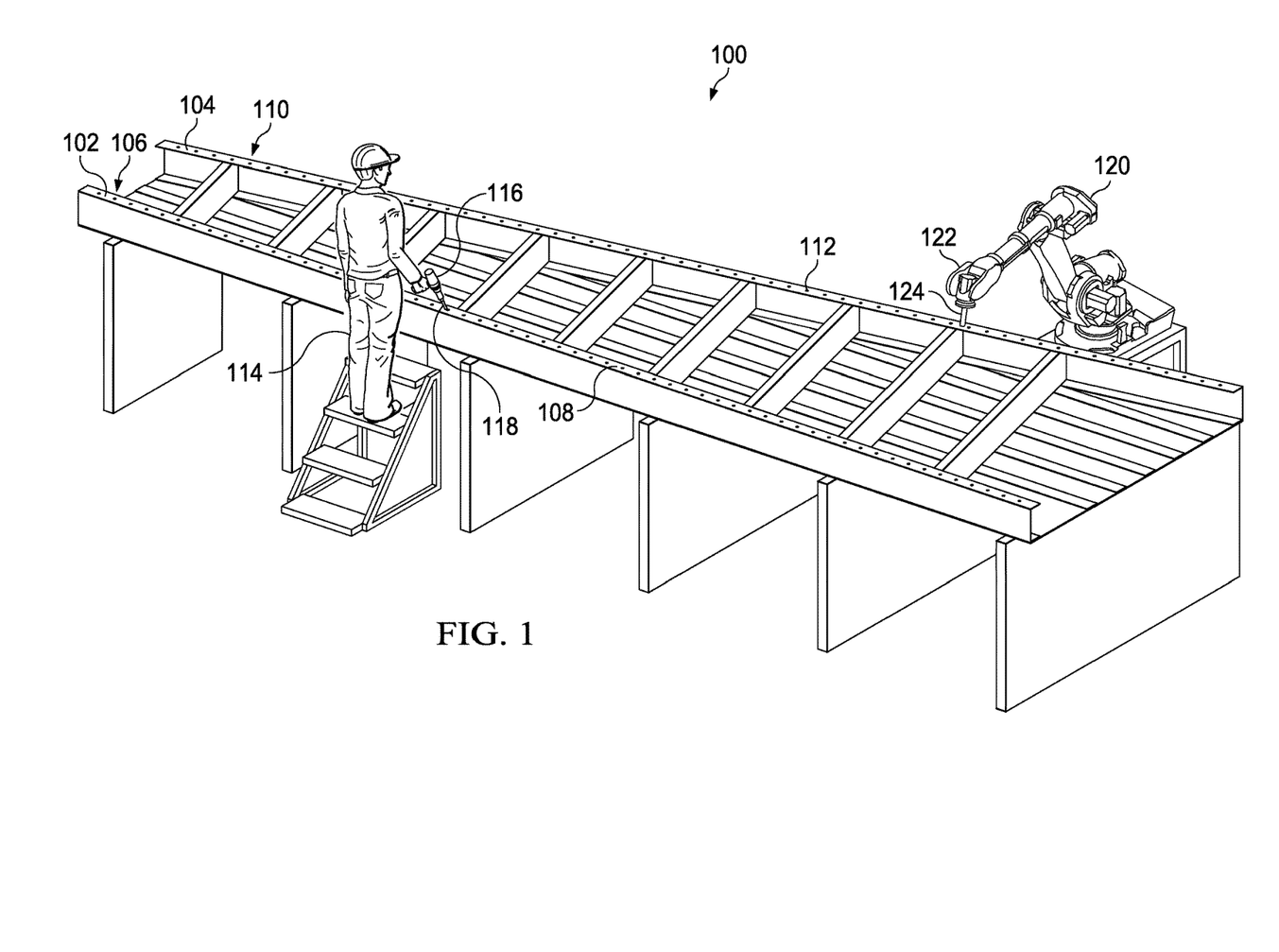
FIG. 1 is an illustration of a manufacturing environment in accordance with an illustrative embodiment.

With reference now to the figures, and in particular with reference to FIG. 1, an illustration of a manufacturing environment is depicted in accordance with an illustrative embodiment. In this example, manufacturing environment 100 includes composite spar 102 and composite spar 104 that are used to form a wing.

For example, holes 106 are formed in composite spar 102. Holes 106 include fibers (not shown) that extend from surface 108 of composite spar 102 as a result of the formation of holes 106. Holes 110 are present in composite spar 104 and have fibers that extend from surface 112 of composite spar 104.

In this example, fibers that extend from surface 108 in holes 106 and from surface 112 in holes 110 are inconsistencies and also referred to as "undesired fibers".

In this illustrative example, there may be thousands of holes 106 or holes 110. This number of holes per spar is an extremely large number of holes for performing operations to reduce inconsistencies, such as undesired fibers, using currently available techniques.

As depicted, these undesired fibers are reduced on composite spar 102 by human operator 114. In this illustrative example, human operator 114 operates drill 116 with abrasive bit 118 to reduce the undesired fibers.

The undesired fibers may also be reduced on composite spar 104 by a robotic machine in the form of robotic arm 120. End effector 122 is connected to robotic arm 120 and abrasive bit 124 is connected to end effector 122. In this example, end effector 122 is configured to perform machining operations. As depicted, robotic arm 120 with end effector 122 is configured to use abrasive bit 124 to reduce undesired fibers in holes 110.

Figure 2:
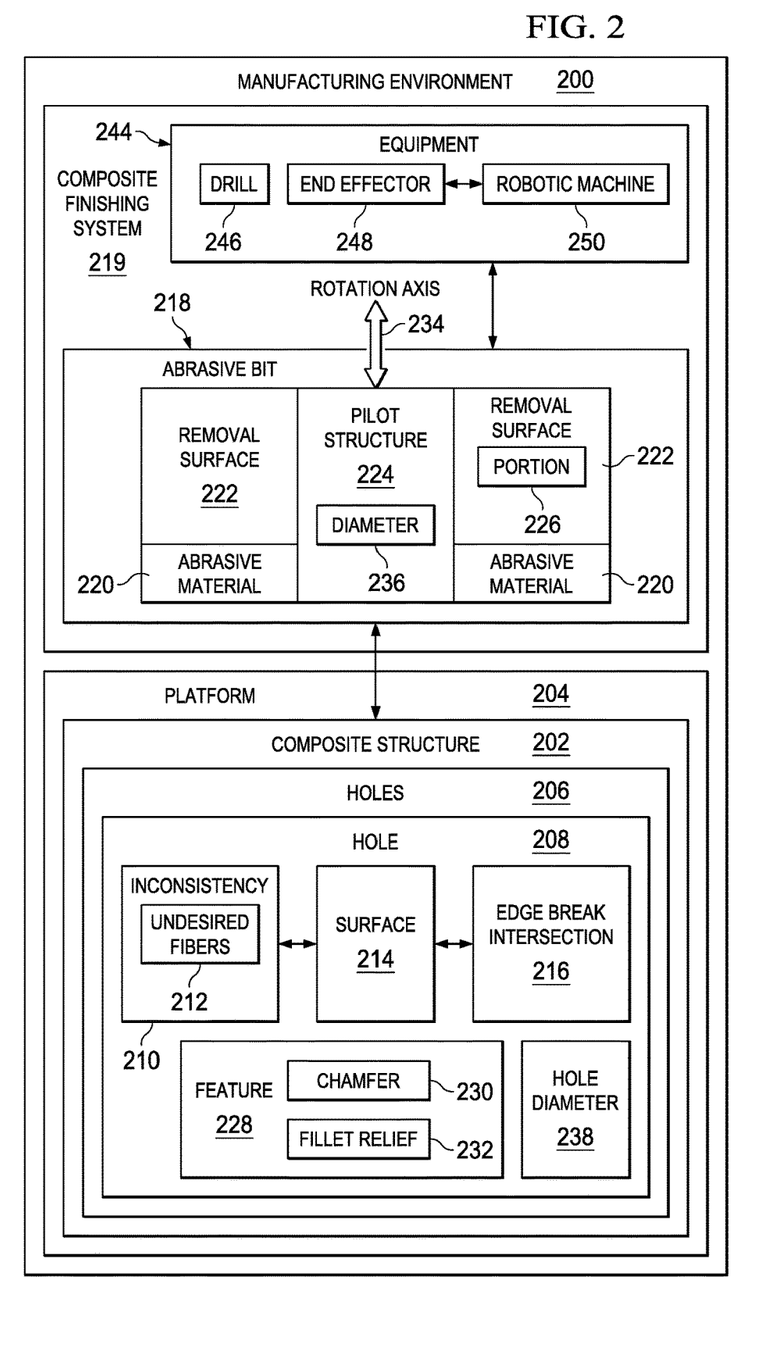
FIG. 2 is an illustration of a block diagram of a manufacturing environment in accordance with an illustrative embodiment.

With reference next to FIG. 2, an illustration of a block diagram of a manufacturing environment is depicted in accordance with an illustrative embodiment. As depicted, manufacturing environment 200 in FIG. 2 is an example of one implementation for manufacturing environment 100 in FIG. 1.

In this illustrative example, composite structure 202 is a structure on platform 204. As depicted, composite structure 202 is comprised of composite materials. These composite materials typically weigh less than metals. The composite materials may be constructed from fibers and a resin. These fibers may be, for example, carbon fibers, fiberglass fibers, or some other suitable type of fiber. In this example, composite structure 202 is comprised of a carbon fiber reinforced polymer.

Composite spar 102 in FIG. 1 is an example of an implementation for composite structure 202. Platform 204 may take various forms. For example, platform 204 may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, a building, or other suitable platform in which composite structure 202 may be used.

In this illustrative example, composite structure 202 has a group of holes 206. As used herein, a "group of" when used with reference items means one or more items. For example, a group of holes 206 is one or more of holes 206.

In this example, hole 208 is a hole in the group of holes 206. Hole 208 has inconsistency 210. As depicted, inconsistency 210 takes the form of undesired fibers 212. For example, undesired fibers 212 extend from surface 214 of hole 208. Undesired fibers 212 extend from surface 214 at edge break intersection 216 of hole 208. As depicted, edge break intersection 216 is any location where a change in surface 214 occurs such that undesired fibers 212 may be present.

In this illustrative example, abrasive bit 218 is part of composite finishing system 219 and is used to remove undesired fibers 212. Abrasive bit 218 has abrasive material 220 on removal surface 222 of abrasive bit 218.

Abrasive material 220 is selected from at least one of a diamond coating or a flexible diamond coating. Abrasive material 220 also may be selected from other materials, including at least one of a ceramic, a ceramic aluminum oxide, silicon carbide, a ceramic iron oxide, horizontal, or other suitable types of materials.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations. Additionally, abrasive bit 218 has pilot structure 224 that positions removal surface 222 relative to edge break intersection 216 of hole 208 in composite structure 202 when pilot structure 224 is placed into hole 208.

In this illustrative example, wherein removal surface 222 has portion 226 that may taper. For example, portion 226 may taper such that removal surface 222 contacts edge break intersection 216 of hole 208 having feature 228 selected from a group consisting of chamfer 230 and fillet relief 232 when pilot structure 224 is inserted into hole 208 and moved in a direction along rotation axis 234 for abrasive bit 218. In this illustrative example, rotation axis 234 is an axis that extends through abrasive bit 218. This axis is one about which abrasive bit 218 rotates during operation of abrasive bit 218.

As depicted, pilot structure 224 is centrally located about rotation axis 234 extending through abrasive bit 218. Pilot structure 224 has diameter 236 sized to hole diameter 238 for hole 208 that allows pilot structure 224 to fit within hole 208 and position removal surface 222 such that undesired fibers 212 may be reduced from surface 214 of edge break intersection 216. In this illustrative example, diameter 236 has a size that allows pilot structure 224 to fit within hole 208. In other words, diameter 236 is smaller than hole diameter 238 such that pilot structure 224 may fit within hole 208 and position removal surface 222 in a desired manner to allow for reduction of undesired fibers 212 extending from surface 214 of edge break intersection 216 during operation of abrasive bit 218.

In removing undesired fibers 212, abrasive bit 218 may be rotated at different speeds. In this illustrative example, abrasive bit 218 rotates about rotation axis 234 at a speed such that undesired fibers 212 extending from surface 214 of hole 208 are reduced in size without removing undesired fibers 212 from composite structure 202.

In this illustrative example, abrasive bit 218 is a tool that may be connected to equipment 244 in composite finishing system 219. For example, equipment 244 may take the form of drill 246. As another example, equipment 244 may include end effector 248 for robotic machine 250.

In one illustrative example, one or more technical solutions are present that overcome a technical problem with forming holes in composite structures. Also, one or more technical solutions are present for a technical problem with removing inconsistencies, such as carbon fibers that extend from edge break intersections of the holes, formed in composite structures.

Further, one or more technical solutions may have a technical effect of reducing repetitive motion issues that occur from human operators using current sanding tools. Also, one or more of the technical solutions also may have a technical effect of reducing the occurrence of carbon fiber slivers entering skin of human operators through the use of an abrasive bit. Further, one or more technical solutions also may reduce the time needed to reduce undesired fibers extending from edge break intersections of holes. As a result, one or more technical solutions provide a technical effect in which an abrasive bit removes undesired fibers that extend from surfaces of holes in the composite structure.

Figure 3:
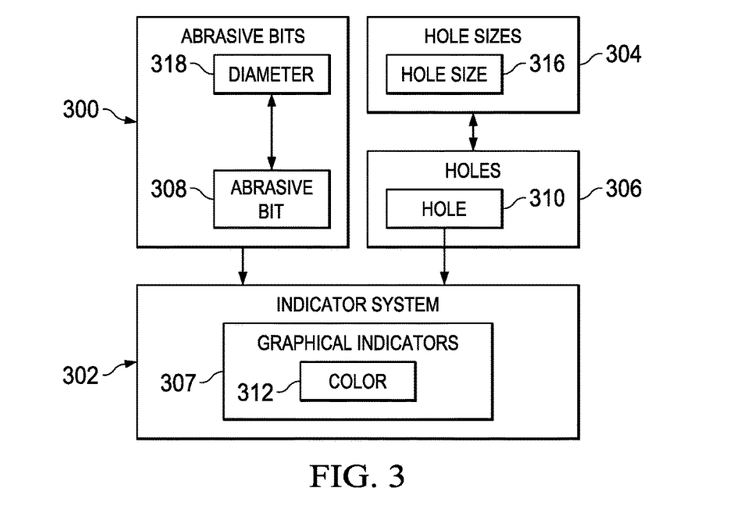
FIG. 3 is an illustration of a block diagram of an indicator system for corresponding abrasive bits to holes in accordance with an illustrative embodiment.

With reference next to FIG. 3, an illustration of a block diagram of an indicator system for corresponding abrasive bits to holes is depicted in accordance with an illustrative embodiment. In this illustrative example, abrasive bits 300 have indicator system 302 that identifies hole sizes 304 for holes 306 that correspond to abrasive bits 300. In other words, each one of abrasive bits 300 may have a diameter that is set for a particular hole size and hole sizes 304 for holes 306.

For example, indicator system 302 includes a group of graphical indicators 307 selected from at least one of a color, an image, a graphic, text, a barcode, a symbol, or some other type of indicator. One or more of these indicators in indicator system 302 may be used by an operator such as human operator 114 or robotic arm 120, shown in FIG. 1, to identify an appropriate abrasive bit in abrasive bits 300 for a particular hole in holes 306.

In this illustrative example, the corresponding indicator in indicator system 302 may be associated with holes 306. For example, if a color is used in indicator system 302, abrasive bit 308 may have color 312. Hole 310 also has color 312 to allow matching up abrasive bit 308 with hole 310 in holes 306. In other words, color 312 identifies hole size 316 in holes sizes 304 that matches diameter 318 for abrasive bit 308. In this manner, the use of indicator system 302 may reduce the possibility that a human operator, such as human operator 114 in FIG. 1, may use an abrasive bit with the wrong size.

The illustration of manufacturing environment 200 and the different components in manufacturing environment 200 in FIG. 2 and FIG. 3 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks, when implemented in an illustrative embodiment.

For example, although abrasive bit 218 is shown as being used in manufacturing environment 200, abrasive bit 218 also may be used in a maintenance environment in which holes may be formed in composite parts for performing maintenance such as part replacement, upgrades, refurbishment, or other types of routine maintenance.

Figure 4:
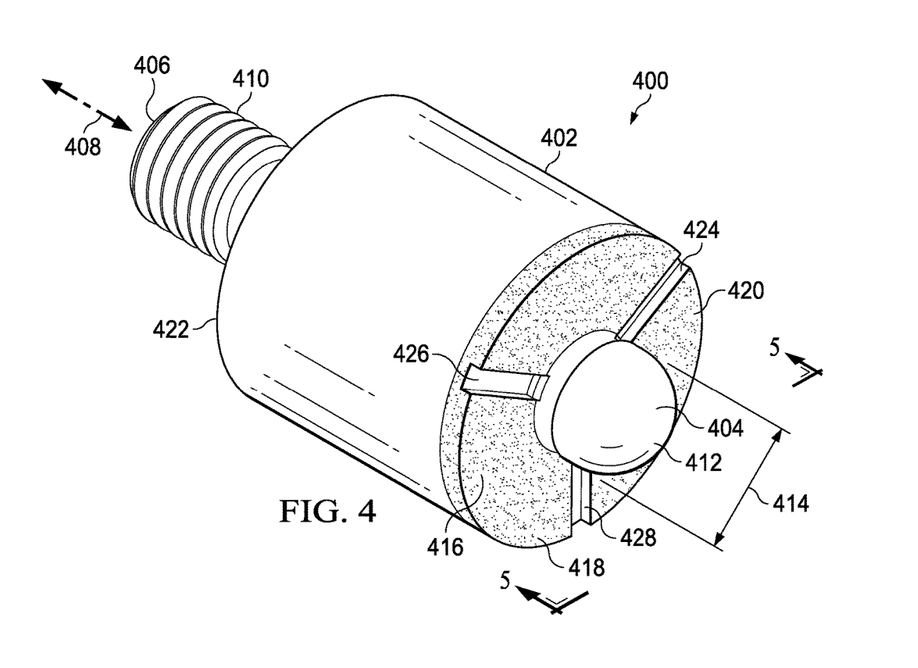
FIG. 4 is an illustration of an abrasive bit in accordance with an illustrative embodiment.

With reference now to FIGS. 4-7, illustrations of an abrasive bit are depicted in accordance with an illustrative embodiment. With reference first to FIG. 4, abrasive bit 400 is an example of one implementation for abrasive bit 218 in FIG. 2, abrasive bits 300 in FIG. 3, abrasive bit 308 in FIG. 3 shown in the block diagrams in these figures. In other words, the blocks showing physical and functional components for these abrasive bits in prior figures may be implemented physically in the illustrative example shown in this figure.

As depicted, body 402 has first end 404 and second end 406. As depicted, rotational axis 408 extends through body 402. Body 402 rotates about rotational axis 408 during operation of abrasive bit 400.

In this illustrative example, body 402 may be formed from a variety of different types of materials. For example, body 402 may be comprised of a material selected from one of a metal, an alloy, steel, aluminum, titanium, a plastic, a ceramic, or other suitable type of material.

In this illustrative example, body 402 has base 410 at second end 406. Base 410 has a shape that is designed to allow body 402 of abrasive bit 400 to be connected to a piece of equipment such as a drill, an end effector, or some other suitable type of equipment that may be used to rotate abrasive bit 400 about rotational axis 408.

In this illustrative example, body 402 has pilot structure 412 at first end 404. Pilot structure 412 has a size and shape that is used to guide abrasive bit 400 into a hole. In this illustrative example, pilot structure 412 has diameter 414. Diameter 414 is configured to fit into the hole in which inconsistencies are to be removed.

In this illustrative example, abrasive section 416 is a part of body 402 on which removal surface 418 has abrasive material 420. In another illustrative example, abrasive section 416 may be a separate physical component that is connected to body 402. For example, abrasive section 416 may be a flexible diamond coating that is attached to or formed on surface 422 of body 402 when abrasive section 416 is a separate component from body 402.

In this illustrative example, removal surface 418 is a portion of surface 422 on body 402 that has abrasive material 420 that may contact an edge break intersection in a hole in a manner that allows for undesired fibers or other inconsistencies to be reduced.

Further, abrasive bit 400 also has channel 424, channel 426, and channel 428 in removal surface 418 of abrasive section 416. These channels allow for debris to be moved away from removal surface 418. As depicted, the debris is generated from removal surface 418 of abrasive section 416 reducing undesired fibers in a hole. This reduction may take the form of sanding in which particles are generated.

Figure 5:
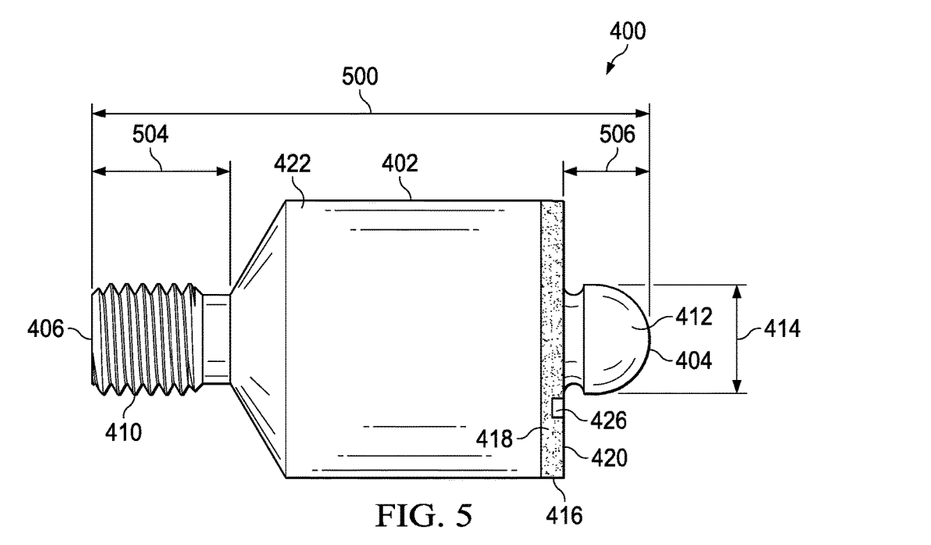
FIG. 5 is an illustration of a side view of an abrasive bit in accordance with an illustrative embodiment.

With reference next to FIG. 5, an illustration of a side view of an abrasive bit is depicted in accordance with an illustrative embodiment. In this illustrative example, a side view of abrasive bit 400 is shown in the direction of lines 5-5 in FIG. 4.

In this cross-sectional view, body 402 has length 500. Base 410 has length 504, and pilot structure 412 has length 506. As shown in the cross-section view of FIG. 5, channel 426 does not exceed the depth of removal surface 418 that has abrasive material 420.

Figure 6:
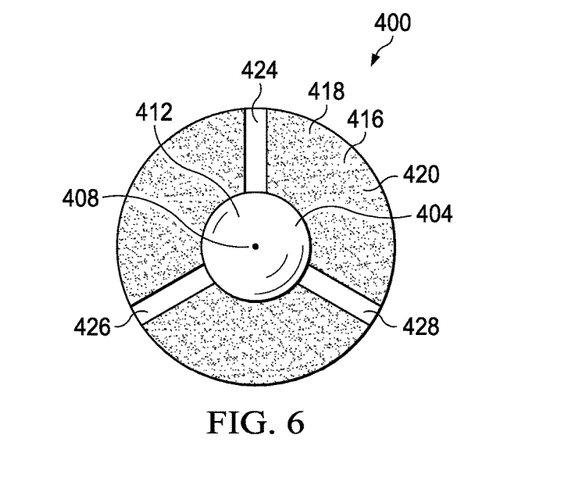
FIG. 6 is an illustration of an end of an abrasive bit in accordance with an illustrative embodiment.

Turning now to FIG. 6, an illustration of an end of an abrasive bit is depicted in accordance with an illustrative embodiment. In this illustrative example, the end view of abrasive bit 400 is shown from first end 404 of body 402 for abrasive bit 400.

Figure 7:
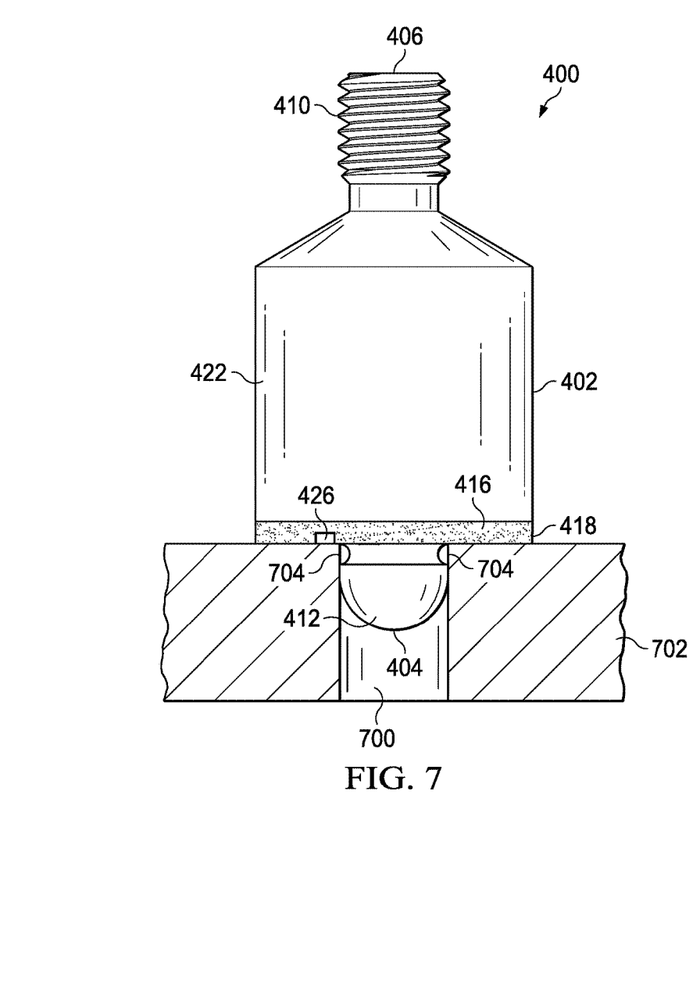
FIG. 7 is an illustration of an abrasive bit positioned in a hole in accordance with an illustrative embodiment.

With reference next to FIG. 7, an illustration of an abrasive bit positioned in a hole is depicted in accordance with an illustrative embodiment. In this illustrative example, abrasive bit 400 is positioned in hole 700 in composite structure 702. Hole 700 in composite structure 702 is shown in a cross-sectional view. As can be seen in this figure, removal surface 418 on body 402 of abrasive bit 400 is in contact with edge break intersection 704. Removal surface 418 is in contact such that inconsistencies such as fibers extending away from the surface of edge break intersection 704 may be reduced when abrasive bit 400 is rotated.

Figure 8:
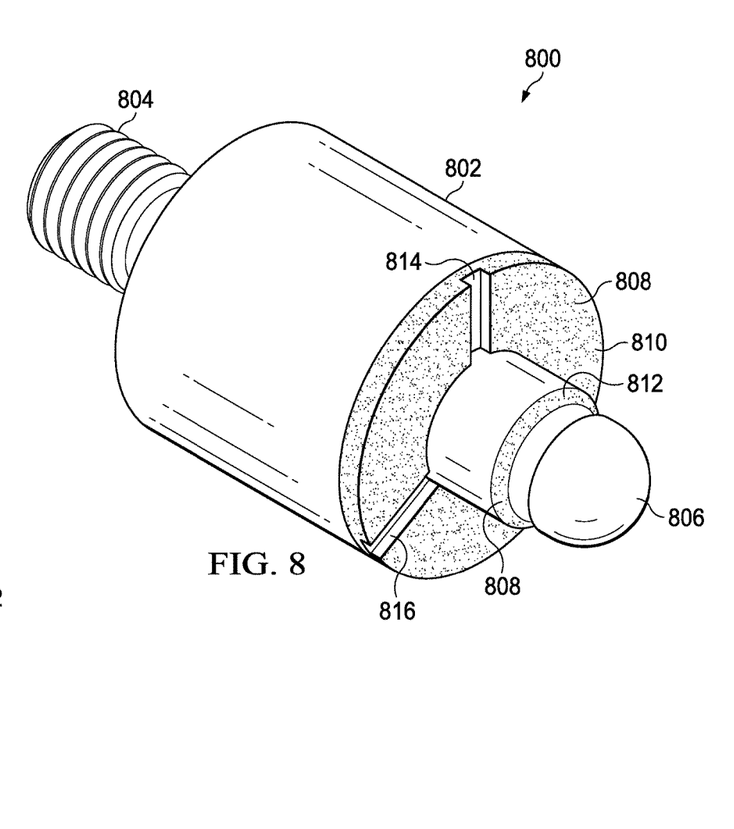
FIG. 8 is an illustration of an abrasive bit in accordance with an illustrative embodiment.
Figure 9:
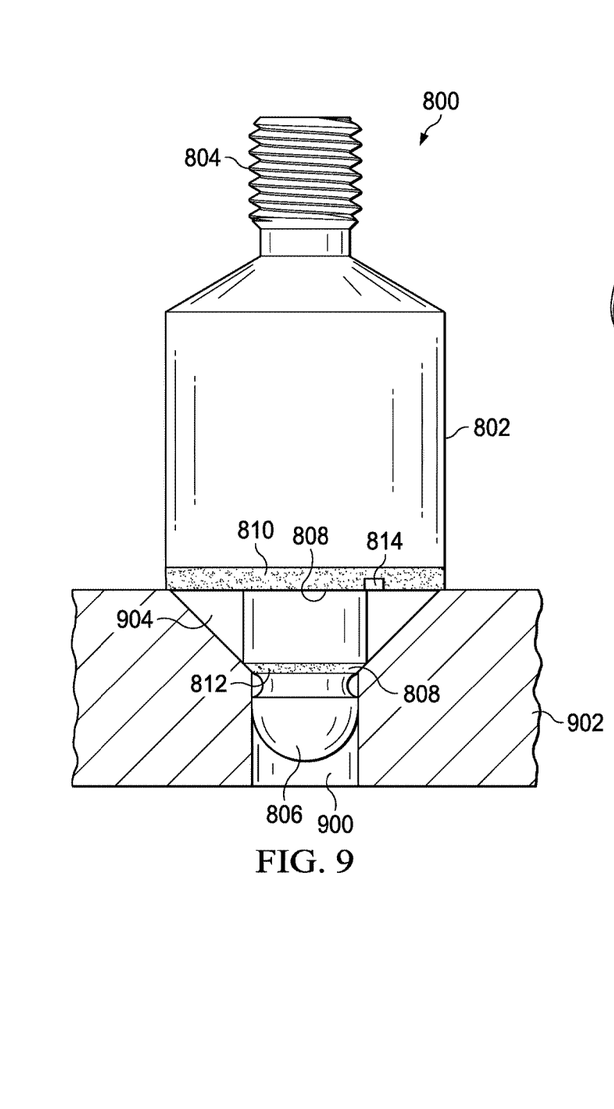
FIG. 9 is an illustration of an abrasive bit positioned in a hole in accordance with an illustrative embodiment.

FIG. 8 and FIG. 9 illustrate an abrasive bit for use in a hole with a chamfer. With reference now to FIG. 8, an illustration of an abrasive bit is depicted in accordance with an illustrative embodiment. As depicted, abrasive bit 800 is configured for use in a hole with a chamfer.

In this illustrative example, abrasive bit 800 has body 802 with base 804 and pilot structure 806. Removal surface 808 is located in abrasive section 810 and abrasive section 812. Channel 814 and channel 816 are present in removal surface 808 in abrasive section 810. Abrasive section 812 is an optional location for removal surface 808.

In FIG. 9, an illustration of an abrasive bit positioned in a hole is depicted in accordance with an illustrative embodiment. In this illustrative example, abrasive bit 800 is positioned in hole 900 in composite structure 902. Hole 900 in composite structure 902 is shown in a cross-sectional view. As depicted, hole 900 has chamfer 904

Figure 10:
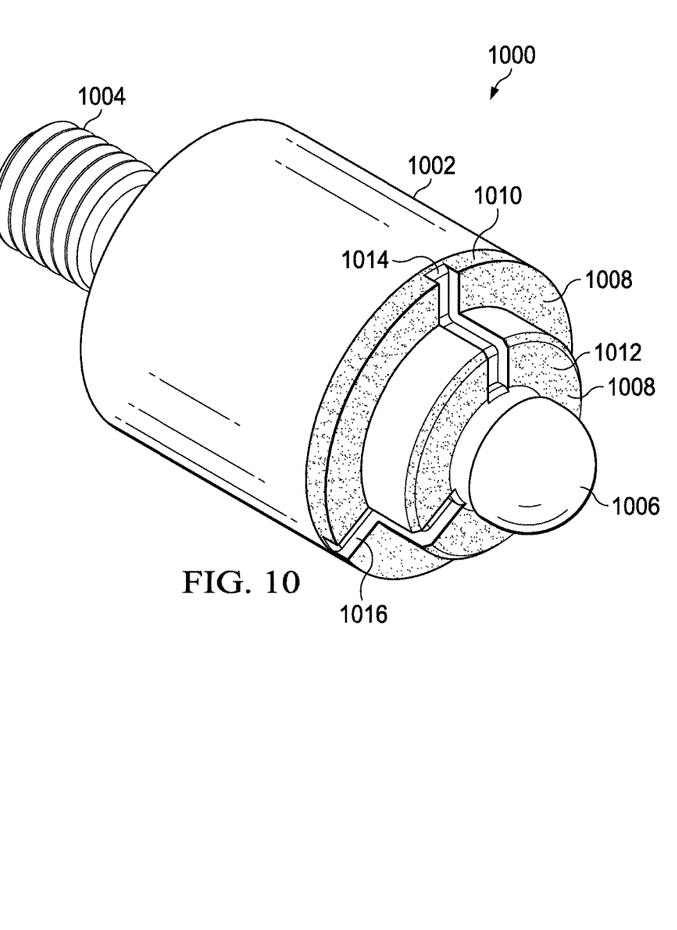
FIG. 10 is an illustration of an abrasive bit in accordance with an illustrative embodiment.
Figure 11:
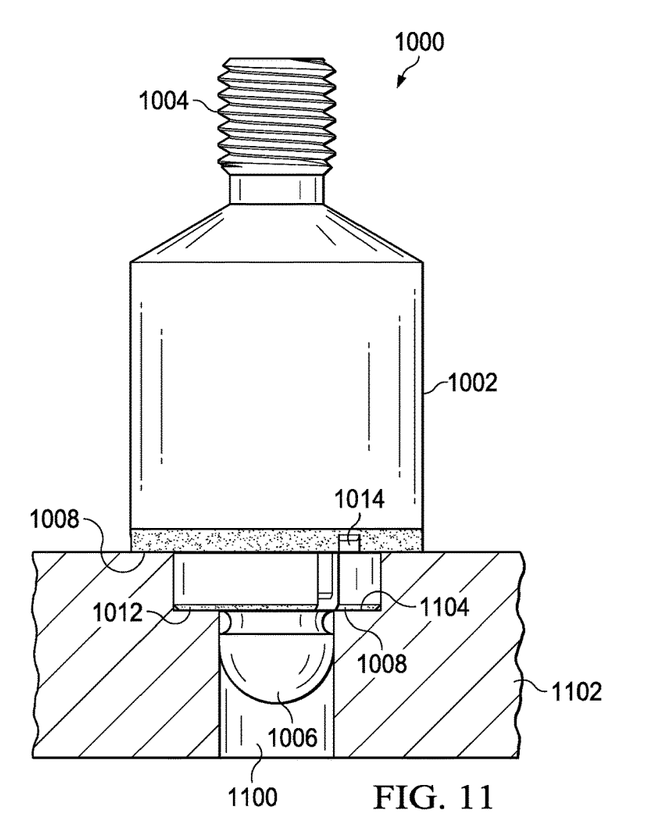
FIG. 11 is an illustration of an abrasive bit positioned in a hole in accordance with an illustrative embodiment.

The abrasive bit shown in FIG. 10 and FIG. 11 is designed for use in a hole with a fillet relief. With reference first to FIG. 10, an illustration of an abrasive bit is depicted in accordance with an illustrative embodiment. As depicted, abrasive bit 1000 is configured for use in a hole with the fillet relief.

In this illustrative example, abrasive bit 1000 has body 1002 and base 1004. Abrasive bit 1000 also has pilot structure 1006. Removal surface 1008 is located in abrasive section 1010 and abrasive section 1012. Channel 1014 and channel 1016 are present in removal surface 1008 in abrasive section 1010. Abrasive section 1012 is an optional location for removal surface 1008.

In FIG. 11, an illustration of an abrasive bit positioned in a hole is depicted in accordance with an illustrative embodiment. In this illustrative example, abrasive bit 1000 is positioned in hole 1100 in composite structure 1102. Hole 1100 in composite structure 1102 is shown in a cross-sectional view. As depicted, hole 1100 has fillet relief 1104.

The illustration of the abrasive bits in FIGS. 4-11 are only meant as illustrations of some possible implementations for abrasive bit 218 shown in block form in FIG. 2. These illustrations are not meant to limit the manner in which other abrasive bits may be implemented.

For example, other abrasive bits may have different shapes and dimensions depending on the particular hole for which the other abrasive bits are designed for use in reducing inconsistencies. As another example, although the abrasive material is shown in two abrasive sections, other illustrative examples may have a single abrasive section that includes removal surface at desired locations for contacting edge break intersections. This single section also may include abrasive material and other locations that may or may not contact undesired fibers. For example, abrasive section 810 in FIG. 8 may be extended to include abrasive section 812 rather than being two separate sections.

Figure 12:
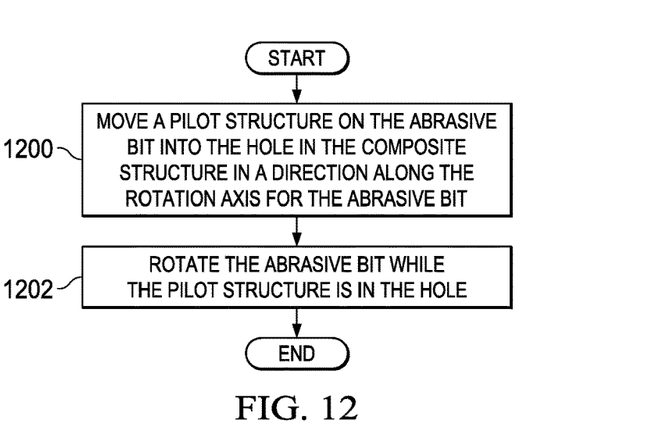
FIG. 12 is an illustration of a flowchart of a process for removing inconstancies from a hole in accordance with an illustrative embodiment.

Turning next to FIG. 12, an illustration of a flowchart of a process for removing inconstancies from a hole is depicted in accordance with an illustrative embodiment. The process illustrated in FIG. 12 may be implemented using abrasive bit 218 in FIG. 2 to remove inconsistencies from a hole in a composite structure. Abrasive bit 400 in FIG. 4, abrasive bit 800 in FIG. 8, and abrasive bit 1000 in FIG. 10 are physical illustrations of examples of an abrasive bit that may be used in this process. In this example, the inconsistencies are undesired fibers that extend from surfaces of the composite structure as a result of operations performed to form the hole.

The process begins by moving a pilot structure on the abrasive bit into the hole in the composite structure in a direction along the rotation axis for the abrasive bit (operation 1200). The pilot structure positions an abrasive surface relative to an edge break intersection of the hole when the pilot structure is placed into the hole.

The process rotates the abrasive bit while the pilot structure is in the hole (operation 1202). The abrasive bit has an abrasive material on a removal surface of the abrasive bit that removes undesired fibers from the edge break intersection of the hole during rotation of the abrasive bit. The process terminates thereafter.

Figure 13:
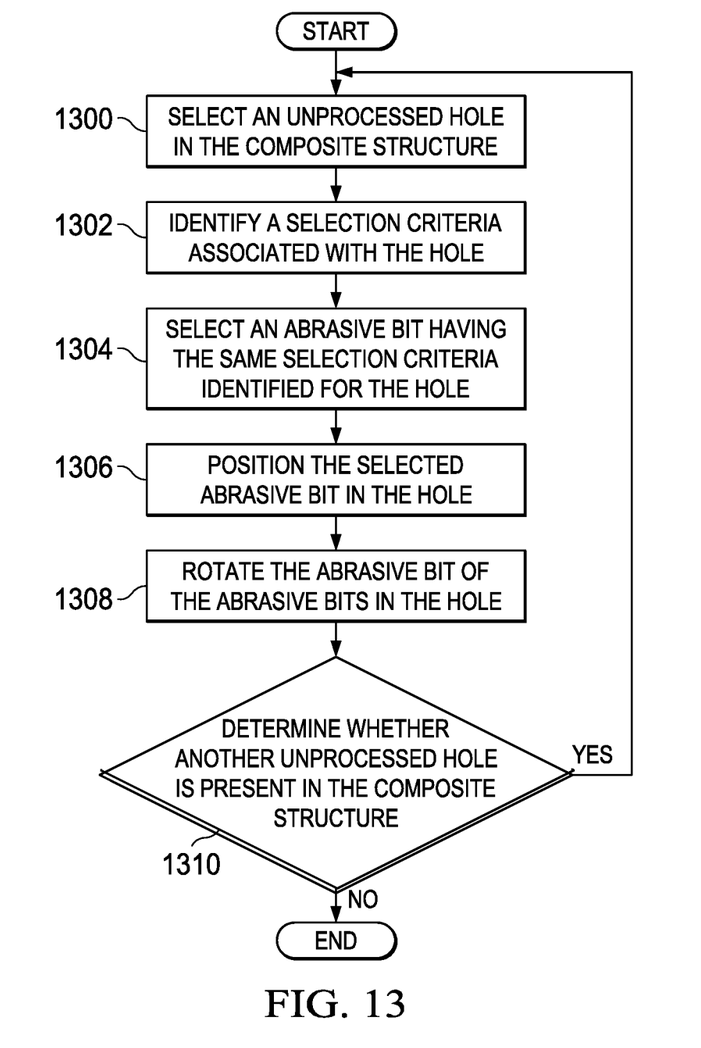
FIG. 13 is an illustration of a flowchart of a process for removing inconsistencies from holes in a composite structure in accordance with an illustrative embodiment.

With reference now to FIG. 13, an illustration of a flowchart of a process for removing inconsistencies from holes in a composite structure is depicted in accordance with an illustrative embodiment. In this illustrative example, an abrasive bit shown in block form in FIG. 1 may be used in this process. Abrasive bit 400 in FIG. 4, abrasive bit 800 in FIG. 8, and abrasive bit 1000 in FIG. 10 are physical illustrations of examples of an abrasive bit that may be used in this process.

The process begins by selecting an unprocessed hole in the composite structure (operation 1300). The process then identifies a selection criteria associated with the hole (operation 1302). The selection criteria may take various forms. For example, selection criteria may be a color, an image, a graphic, text, a barcode, a symbol, or some other type of indicator. The process then selects an abrasive bit having the same selection criteria identified for the hole (operation 1304). The process positions the selected abrasive bit in the hole (operation 1306). The process rotates the abrasive bit of the abrasive bits in the hole (operation 1308). This rotation may be performed at a speed such that undesired fibers are reduced by sanding rather than removing the undesired fibers from the composite structure.

The process determines whether another unprocessed hole is present in the composite structure (operation 1310). If another unprocessed hole is present, the process returns to operation at 1300. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations to rotate or control operation of an abrasive bit connected to a drill or an end effector of a robotic machine.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the abrasive bit described in the process in the flowchart in FIG. 12 may be rotated prior to moving the abrasive bit towards or into the hole in which inconsistencies, such as undesired fibers, are present. In other examples, the abrasive bit may be rotated after the abrasive bit is positioned as desired.

Figure 14:
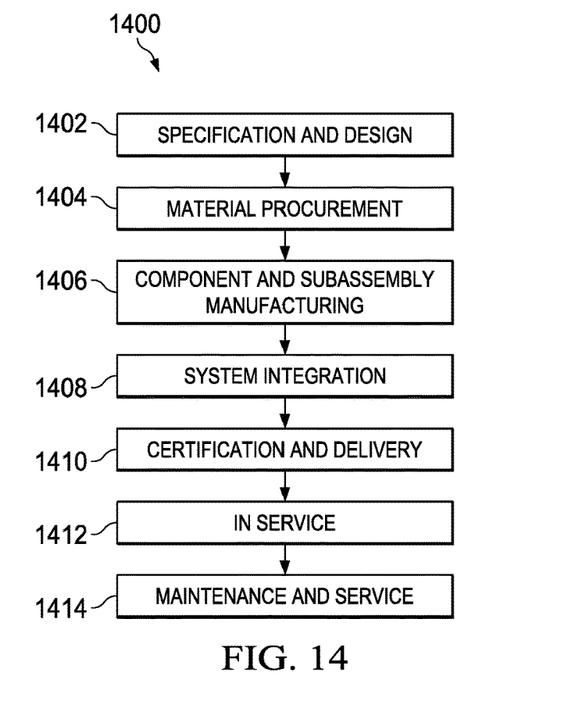
FIG. 14 is an illustration of a block diagram of an aircraft manufacturing and service method in accordance with an illustrative embodiment.
Figure 15:
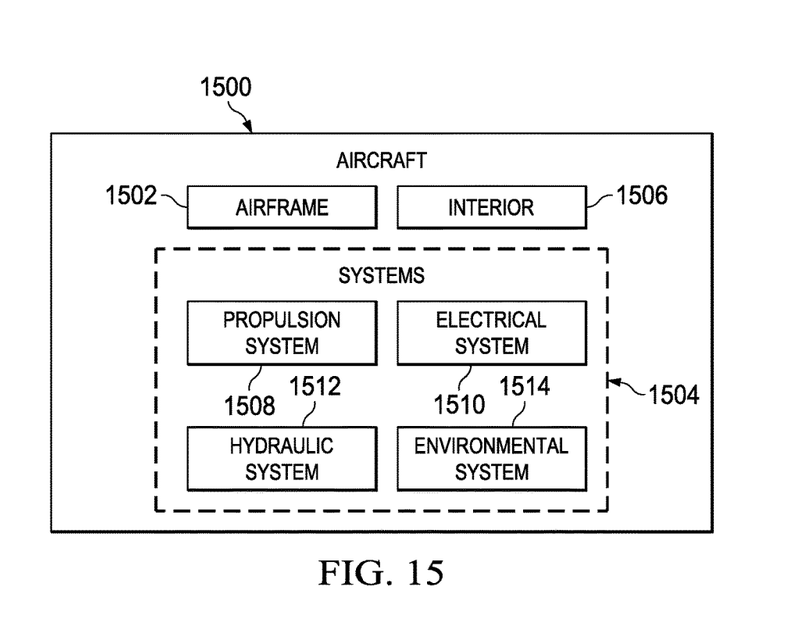
FIG. 15 is an illustration of a block diagram of an aircraft in which an illustrative embodiment may be implemented.

The illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included.

Although an aerospace example is shown, different illustrative embodiments may be applied to other industries, such as the automotive industry. Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. The fabrication or manufacturing of these components may be performed using abrasive bits in accordance with illustrative examples to reduce inconsistencies, such as undesired fibers formed during the drilling of holes in composite structures in the components.

As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both.

The use of a number of the different illustrative embodiments may substantially expedite the assembly of aircraft 1500, reduce the cost of aircraft 1500, or both expedite the assembly of aircraft 1500 and reduce the cost of aircraft 1500. The speed at which the assembly of aircraft may be reduced through the use of less time to remove inconsistencies from holes formed in composite structures that are to be assembled. Further, using abrasive bits increases the ergonomics as compared to current sanding of holes by human operators.

Figure 16:
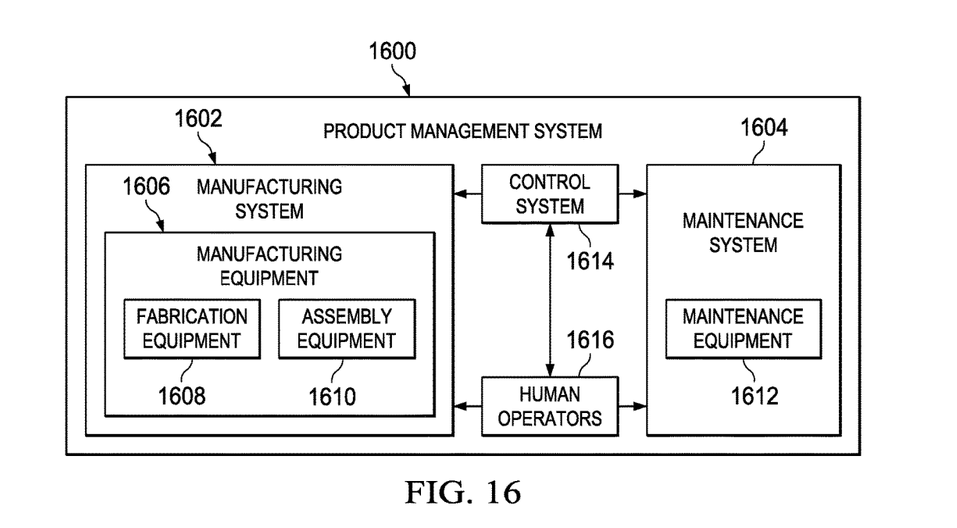
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 may include at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that may be used to fabricate components for parts used to form aircraft 1500. For example, fabrication equipment 1608 may include machines and tools. These machines and tools may be at least one of a drill, a hydraulic press, a furnace, a mold, a composite tape laying machine, a vacuum system, a lathe, or other suitable types of equipment. Fabrication equipment 1608 may be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500. In particular, assembly equipment 1610 may be used to assemble components and parts to form aircraft 1500. Assembly equipment 1610 also may include machines and tools. These machines and tools may be at least one of a robotic arm, a crawler, a faster installation system, a rail-based drilling system, or a robot. The tools also include abrasive bits that may be used to remove inconsistencies, such as undesired fibers resulting from holes drilled in composite components. Assembly equipment 1610 may be used to assemble parts, such as seats, horizontal stabilizers, wings, engines, engine housings, landing gear systems, and other parts for aircraft 1500.

In this illustrative example, maintenance system 1604 includes maintenance equipment 1612. Maintenance equipment 1612 may include any equipment needed to perform maintenance on aircraft 1500. Maintenance equipment 1612 may include tools for performing different operations on parts on aircraft 1500. These operations may include at least one of disassembling parts, refurbishing parts, inspecting parts, reworking parts, manufacturing replacement parts, or other operations for performing maintenance on aircraft 1500. These operations may be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable devices. In some cases, maintenance equipment 1612 may include fabrication equipment 1608, assembly equipment 1610, or both to produce and assemble parts that may be needed for maintenance. Equipment may include the use of abrasive bits for removing inconsistencies from holes formed during the drilling of holes in composite structures.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 may control the operation of at least one of fabrication equipment 1608, assembly equipment 1610, or maintenance equipment 1612. For example, control system 1614 may control the operation of robots that have abrasive bits used to reduce inconsistencies, such as undesired fibers formed during drilling of holes in composite structures The hardware in control system 1614 may be using hardware that may include computers, circuits, networks, and other types of equipment. The control may take the form of direct control of manufacturing equipment 1606. For example, robots, computer-controlled machines, and other equipment may be controlled by control system 1614. In other illustrative examples, control system 1614 may manage operations performed by human operators 1616 in manufacturing or performing maintenance on aircraft 1500. For example, control system 1614 may assign tasks, provide instructions, display models, or perform other operations to manage operations performed by human operators 1616.

In the different illustrative examples, human operators 1616 may operate or interact with at least one of manufacturing equipment 1606, maintenance equipment 1612, or control system 1614. This interaction may be performed to manufacture aircraft 1500.

Of course, product management system 1600 may be configured to manage other products other than aircraft 1500. Although aircraft management system 1600 has been described with respect to manufacturing in the aerospace industry, product management system 1600 may be configured to manage products for other industries. For example, product management system 1600 may be configured to manufacture products for the automotive industry as well as any other suitable industries.

Thus, those embodiments provide a method and apparatus for reducing inconsistencies from holes formed in composite structures. These inconsistencies include undesired fibers at edge break intersections in the hole. Inconsistencies may be reduced by using an abrasive bit having an abrasive material on a removal surface of the abrasive bit. The removal surface is configured to contact the edge break intersections when the abrasive bit is positioned within the hole. The abrasive bit has a pilot structure that positions an abrasive surface relative to an edge break intersection of a hole in a composite structure when the pilot structure is placed into the hole. In this illustrative example, the abrasive bit is rotated while the abrasive bit is positioned in the hole in a manner that reduces the inconsistencies. For example, the abrasive bit may be rotated in a manner that causes sanding of undesired fibers resulting from drilling the hole.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

With the use of an abrasive bit, repetitive motion issues that occur from human operators using current sanding tools may be reduced. Additionally, the entry of carbon fiber slivers into skin of human operators also may be reduced through the use of an abrasive bit.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite finishing system comprising:
   an abrasive bit having a barrel body and a planar abrasive section at a distal end of the barrel body, wherein the abrasive section includes abrasive material on a removal surface wherein the removal surface comprises multiple radial channels extending from a pilot structure to an outer circumference of the barrel body, wherein the channels do not exceed the depth of the removal surface and are configured to allow debris to move away from the removal surface; and the pilot structure extending from the distal end of the barrel body that is perpendicular to the planar abrasive section and configured to position the removal surface in contact with an edge break intersection of a hole in a composite structure when the pilot structure is placed into the hole.

2. The composite finishing system of claim 1, further comprising a second abrasive section extending from the distal end of the barrel body and located between the abrasive section and the pilot structure and having a smaller diameter than the barrel body and a second removal surface configured to contact a second edge break intersection of the hole having a chamfer when the pilot structure is inserted into the hole and moved in a direction along a rotation axis for the abrasive bit, wherein the second removal surface is tapered.

3. The composite finishing system of claim 1, wherein the pilot structure is centrally located about a rotation axis extending through the abrasive bit.

4. The composite finishing system of claim 1, wherein the pilot structure has a diameter sized to a hole diameter for the hole that allows the pilot structure to fit within the hole and position the removal surface such that undesired fibers may be reduced at the edge break intersection.

5. The composite finishing system of claim 1, wherein the abrasive material is selected from at least one of a diamond coating or a flexible diamond coating.

6. The composite finishing system of claim 1 further comprising:
an end effector configured to perform machining operations, wherein the abrasive bit is configured to be connected to the end effector.

7. The composite finishing system of claim 6 further comprising:
a robotic machine, wherein the end effector is configured to be connected to the robotic machine and perform an operation to reduce undesired fibers in the hole.

8. The composite finishing system of claim 1, wherein the abrasive bit is configured to rotate at a speed such that undesired fibers extending from a surface of the hole are reduced in size without removing the undesired fibers from the composite structure.

9. The composite finishing system of claim 1, wherein the abrasive bit has an indicator system that identifies a hole size that corresponds to the abrasive bit.

10. The composite finishing system of claim 9, wherein the indicator system is selected from at least one of a color, a graphical indicator, text, or a symbol.

11. The composite finishing system of claim 1, wherein the hole is located in a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, and a building.

12. The composite finishing system of claim 1, further comprising a second abrasive section extending from the distal end of the barrel body located between the abrasive section and the pilot structure and having a smaller diameter than the barrel body and a second planar removal surface configured to contact a second edge break intersection of the hole having a fillet relief when the pilot structure is inserted into the hole and moved in a direction along a rotation axis for the abrasive bit, wherein the radial channels on the removal surface extend onto the second removal surface.

13. A method for removing inconsistencies from a hole in a composite structure, the method comprising:
moving a pilot structure on an abrasive bit into the hole in the composite structure in a direction along a rotation axis for the abrasive bit, wherein the pilot structure extends from an end of the abrasive bit that has a first planar abrasive section with a first removal surface perpendicular to the rotation axis and configured to contact an edge break intersection of the hole when the pilot structure is placed into the hole, wherein the first removal surface comprises multiple radial channels extending from the pilot structure to an outer circumference of the abrasive bit, wherein the channels do not exceed the depth of the removal surface and are configured to allow debris to move away from the first removal surface; and
rotating the abrasive bit while the pilot structure is in the hole, wherein abrasive material on the first removal surface of the abrasive section reduces undesired fibers from the edge break intersection of the hole.

14. The method of claim 13, wherein rotating the abrasive bit while the pilot structure is in the hole comprises:
rotating the abrasive bit while the pilot structure is in the hole at a speed such that the undesired fibers extending from a surface of the hole are reduced in size without removing the undesired fibers from the composite structure.

15. The method of claim 13, wherein the abrasive bit further comprises a second abrasive section extending from the end of the abrasive bit located between the first planar abrasive section and the pilot and having a tapered removal surface that contacts an edge break intersection of the hole having a chamfer when the pilot structure is inserted into the hole and moved in the direction along rotation axis for the abrasive bit.

16. The method of claim 13, wherein the pilot structure is centrally located about the rotation axis extending through the abrasive bit.

17. The method of claim 13, wherein the pilot structure has a diameter sized to a hole diameter for the hole that allows the pilot structure to fit within the hole and position the removal surface such that undesired fibers may be reduced at the edge break intersection.

18. The method of claim 13, wherein the abrasive material is selected from at least one of a diamond coating or a flexible diamond coating.

19. The method of claim 13, wherein the abrasive bit is connected to an end effector that performs machining operations, wherein the abrasive bit is connected to the end effector and the end effector is connected to a robotic machine that performs an operation to reduce the undesired fibers in the hole.

20. The method of claim 13, wherein the abrasive bit has an indicator system that identifies a hole size that corresponds to the abrasive bit.

21. The method of claim 20, wherein the indicator system is selected from at least one of a color, a graphical indicator, text, or a symbol.

22. The method of claim 13, wherein the abrasive bit further comprises a second abrasive section extending from the end of the abrasive bit located between the abrasive section and the pilot structure and having a second planar removal surface that contacts a second edge break intersection of the hole having a fillet relief when the pilot structure is inserted into the hole and moved in the direction along rotation axis for the abrasive bit, wherein the radial channels on the removal surface extend onto the second removal surface.

* * * * *